Patented Aug. 8, 1950

2,517,588

UNITED STATES PATENT OFFICE 2,517,588

PROCESS FOR MANUFACTURE OF PENALDIC ACIDS AND THEIR DERIVATIVES

Samuel A. Morell, Milwaukee, Wis., and Richard W. Von Korff, Minneapolis, Minn.; dedicated to the People of the United States of America No Drawing. Original application November 12, 1946, Serial No. 709,107. Divided and this application November 20, 1947, Serial No. 787,262

4 Claims. (Cl. 260—471)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to us of any royalty thereon.

This is a division of our copending application Serial No. 709,107, filed November 12, 1946.

This invention relates to derivatives of penaldic acid and to a process of manufacturing them. These compounds are useful as intermediates in the synthesis of certain biologically active substances.

It is well known that when antibiotics of the penicillin class are degraded chemically, as for example by hydrolysis, one of the two split products initially formed is a penaldic acid:

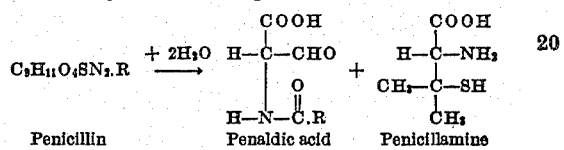

The type of penaldic acid so formed is determined by the group R, which may be benzyl, Δ²-pentenyl, n-amyl, p-hydroxybenzyl, n-heptyl, and so forth, according to whether the original penicillin-type is -G, -F, dihydro-F, -X, -K, and so forth, respectively. The penaldates so formed, however, are very unstable, rapidly losing a molecule of carbon dioxide to form the corresponding penilloates, which are acyl derivatives of aminoacetaldehyde:

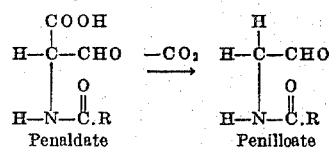

This invention makes it possible to synthesize the penaldates from the simple and readily available amino acid, glycine. In accordance with our invention, the penaldic acids are obtained as stable derivatives and hence may be stored for long periods of time to be used in subsequent synthesis of important biologically active substances. We may obtain the penaldates in the form of their acetals:

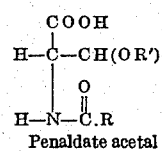

Penaldate acetal where R is an aliphatic, aromatic or substituted aliphatic or aromatic radical and R' is an aliphatic or substituted aliphatic radical.

As an additional feature of our invention, the first member of the penaldic acid series, i. e. the formyl homologue, where R is hydrogen, termed here the formyl penaldic acid, and now known to the art and text writers as norpenaldic acid (see page 492 of Chemistry of Penicillin—Princeton University Press, 1949):

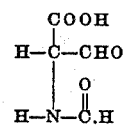

First homologue of the penaldic acid series may also be obtained in the form of very stable derivatives, namely, as anolic esters of the alkyl formyl penaldates:

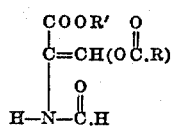

Enolic ester of alkyl formyl penaldate where R is an aliphatic, aromatic or substituted aliphatic or aromatic radical and R' is an aliphatic or substituted aliphatic radical.

Our invention may best be illustrated by the following series of chemical reactions which, starting with glycine (I) involve glycine esters, as such, or in the form of their salts with inorganic acids (II); N-formylation to N-formyl glycine esters (III); C-formylation in inert solvents (Claisen-type condensation) with alkyl formates and metallic alkoxides to produce metallic enolates of alpha-formylamino beta-hydroxyacrylic esters (IV), alcoholysis to alpha-amino beta, beta-dialkoxy propionic esters, in the form of their salts with inorganic acids (V); saponification to salts of alpha-amino beta, beta-dialkoxy propionic acids (VI); acylation to salts of the penaldate acetals (VII); and finally, acidification to the free penaldic acid acetals (VIII). In these illustrative reactions, the symbols R, R', X, X' and M have the following significance:

R is an aliphatic, aromatic or substituted aliphatic or aromatic radical.

R' is an aliphatic or substituted aliphatic radical.

X is an inorganic anionic radical, such as sulfate, halide, phosphate, and so forth.

X' is a halogen atom.

M is a metallic atom of the alkali or alkaline earth group.

*Reactions illustrating the manufacture of derivatives of penaldic acid*

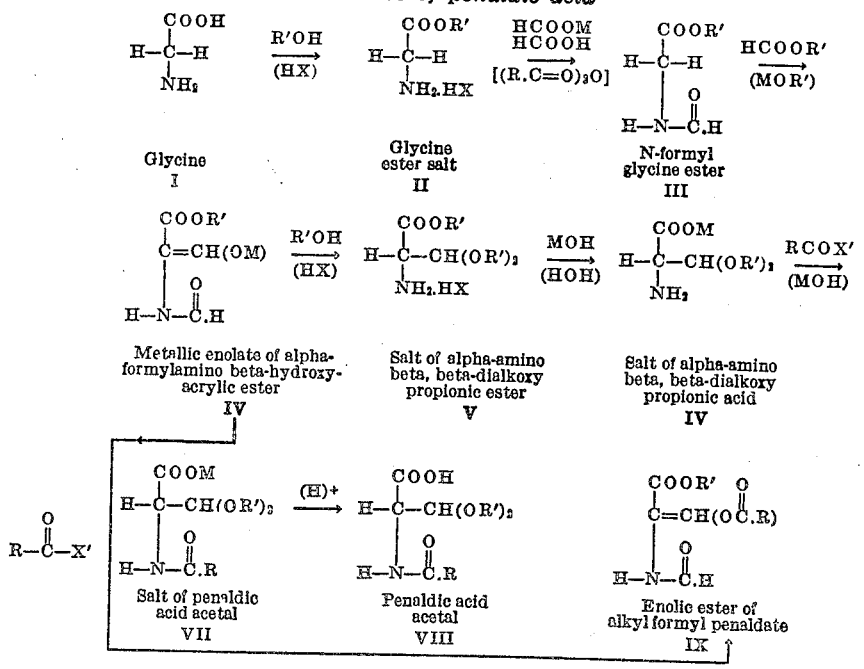

When it is desired to obtain the alkyl formyl penaldates in the form of their enolic esters (IX), then the metallic enolates of the alpha-formyl-amino beta-hydroxyacrylic esters are treated directly with acyl halides, as indicated above in the reaction from step IV directly to step IX.

In our process, the individual steps result in good yields of product, so that the overall yield of penaldate from glycine is also good, as will be evident from the examples given below. Sometimes it is convenient to isolate certain of the intermediates, as for example products III, IV, IX, or the free acid of VI. These isolations, however, are not necessary. Sometimes it is more convenient to combine the successive steps of the process.

It is important, however, that the amino group of the glycine be blocked (protected) by a formyl group, rather than by any other acyl group, since the subsequent condensation with formic ester, which introduces the aldehyde group directly onto the CH₂ group of the original glycine, is also a formylation reaction (C-formylation as contrasted with N-formylation) and the presence of acyl groups other than formyl on the blocked amino group of glycine causes complicated interactions which interfere with the success of the C-formylation reaction. Even amino blocking groups, like carbobenzoxy $$(C_6H_5CH_2-O-\overset{O}{\underset{\|}{C}}-)$$

for example, complicate the C-formylation reaction. This particular group, in fact, exemplifies our discovery of N-formylation as a necessary precedent to C-formylation. Contrary to expectations, we found that when N-carbobenzoxy glycine ethyl ester (X) was used, the only product which could be isolated (and this in very low yield) was the N-formyl derivative (XI), identified as the crystalline enolic benzoate of ethyl N-formyl penaldate (XII):

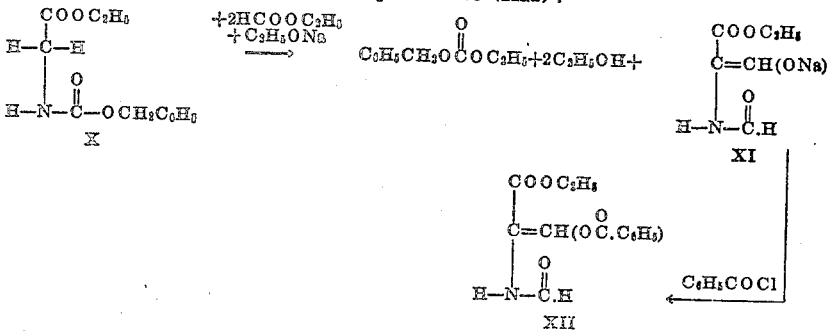

The regeneration of the free amino group from its N-formylated state during the alcoholysis reaction is also necessary. This reaction converts the enolicaldehyde group to its acetal form, as shown above in the reaction proceeding from step IV to step V. This relatively gentle means of regenerating the free amino group during the alcoholysis reaction contributes substantially to the success of our invention and is in contrast, for example, with the relatively vigorous conditions of caustic or strongly acidic hydrolysis usually required to regenerate a free amino group from its corresponding amide. This more or less automatic regeneration of the free amino group is particularly advantageous if, for example, one desires to obtain alpha-amino beta, beta-dialkoxy propionic acid (the free acid of VI) which, as mentioned above, is one of the convenient intermediates to isolate in the process, it being readily obtained in crystalline form and is easily and practically quantitatively acylated to the pure penaldate acetals.

It is evident, therefore, that our invention is particularly beneficial in the fact that the very group—i. e. the N-formyl group—which is ideally suited for temporarily blocking or protecting the amino group of the glycine in order to conduct most effectively the C-formylation reaction, is also the group which is automatically and quantitatively removed during the subsequent alcoholysis reaction, at which point it is advantageous and desirable to regenerate the free amino group which existed as such in the original glycine.

The following examples, wherein the manufacture of derivatives of G-penaldic acid (wherein R of Formula VIII is $C_6H_5CH_2$—) and several enolic esters of alkyl formyl penaldates (Formula IX) are described, serve to illustrate our invention. These examples, however, should not be construed as limiting our invention to these particular penaldates, since other acylating agents are equally well suited to the production of other penaldates where R may vary in the aliphatic or aromatic class as indicated above. In addition to ethanol for the esterification and alcoholysis reactions, propanol, methanol, butanol, and so forth may be used; in addition to sodium hydroxide for the saponifications, potassium and lithium hydroxides may be used; in addition to hydrochloric acid for the acidifications, hydrobromic and hydrolodic acids may be used; in addition to sodium ethoxide plus ethyl formate for the C-formylations, potassium and lithium ethoxides and the corresponding methoxides or propoxides plus ethyl formate may be used. In addition to acyl chlorides for the acylation reactions and acetic anhydride as the dehydrating agent during N-formylations, other acyl halides, such as acyl bromides and iodides, may be used, as well as other dehydrating agents. Other similar reagents and homologues are equally well suited to the successful practice of this invention.

*Example 1*

A solution of 139 parts of glycine ethyl ester hydrochloride (1 mol) in 100 parts of 97% formic acid was mixed with another solution prepared from 68 parts of sodium formate (1 mol) dissolved in 150 parts of 97% formic acid. The mixture was allowed to stand overnight at 5° C. The sodium chloride which had separated was then removed by filtration. The filtrate was mixed with 300 parts of acetic anhydride in a vessel equipped with a reflux condenser and provided with a suitable means for cooling the resulting exothermic reaction. When the vigorous reaction had subsided (about 30 minutes), the mixture was concentrated in vacuo to the consistency of a thin syrup. After cooling to room temperature, 300 parts of ether was added and the precipitated sodium chloride again removed by filtration. (The combined yield of sodium chloride was quantitative.) The filtrate was distilled in vacuo and 125 parts (95% yield) of the product, N-formyl glycine ethyl ester, was obtained in the fraction, B. R. 119–120° C./1 mm.; $n_D^{25}=1.4501$. By reworking the foreshots and tailings, the yield was practically quantitative. The product exhibited the following analysis:

|  | C | H | N | Ethoxy | Formyl |
|---|---|---|---|---|---|
| Theory for $C_5H_9O_3N$ | 45.78 | 6.90 | 10.68 | 34.3 | 22.2 |
| Found | 45.80 | 6.78 | 10.60 | 34.0 | 22.1 |

In a reaction vessel equipped with an agitator, a suitable means of cooling, a reflux condenser and a means for adding materials without exposure to atmospheric moisture, there was added 131 parts of N-formyl glycine ethyl ester (1 mol), prepared as described above, 296 parts of ethyl formate (4 mols) and 250 parts of benzene. Ths mixture was cooled to about 0° to 5° C. and, with agitation, a suspension of 68 parts of alcohol-free sodium ethoxide (1 mol) in 250 parts of benzene was added during the course of about 30 minutes, the temperature of the reaction mixture being maintained at about 0° to 5° C. The clear solution was allowed to stand overnight at this temperature without any agitation. During the course of about 10 minutes, 1000 parts of ether were then added with constant agitation of the reaction mixture. The resulting precipitate, which was the crude sodium enolate of ethyl alpha-formylamino beta-hydroxyacrylate, was then filtered without exposure to atmospheric moisture. After drying in vacuo, 174 parts of the product was obtained, which amounted to a yield of 96% of that required by theory.

In a reaction vessel equipped with an agitator, a heater, a distilling column and a suitable means for adding materials without exposure to atmospheric moisture, there was added 181 parts of the crude sodium enolate of ethyl alpha-formylamino beta-hydroxyacrylate (1 mol), prepared as described above, 1500 parts of absolute ethanol containing 10 to 12 percent dry HCl by weight, and an additional 1000 parts of absolute ethanol. The mixture was agitated for three hours at room temperature. Heating was then started and 1000 parts of distillate was collected. After cooling to room temperature, the total HCl present in the residue was determined by titrating a small aliquot (about 1 gram) in 95 percent ethanol with standard alcoholic alkali to a phenolphthalein end-point. The free HCl present in the residue was then calculated by subtraction of 1 mol of HCl from the total HCl found by the titration. The amount of sodium required to neutralize this free HCl was then dissolved in dry ethanol and, with agitation, added to the reaction mixture. In this manner, the ethyl ester of alpha-amino beta, beta-diethoxy propionic acid was retained in the alcoholic solution in the form of its hydrochloride salt. The contents of the vessel were then filtered and the salt cake washed twice with 100 parts of dry ethanol.

To the filtrate, there was added 600 parts of 4 N NaOH and the resulting saponification reaction was allowed to proceed overnight at room temperature. A stream of $CO_2$ gas was then passed through the solution until it was acid to phenolphthalein. The mixture was filtered and the salt cake washed twice with 100 parts of 95% ethanol. The filtrate, which now contained the sodium salt of alpha-amino beta, beta-diethoxy propionic acid was then concentrated in vacuo to a weight of about 250 parts. (This salt may be converted directly to the crystalline free acid, in accordance with the procedure of Example 7, infra.)

The latter salt concentrate was then transferred to a reaction vessel which was equipped with an agitator, a suitable means for cooling, and a means for simultaneously adding two separate reactants. A solution of 160 parts of sodium carbonate in 400 parts of water was added to the concentrate, the mixture was agitated and cooled to about 0° to 5° C. The acylation reaction was then conducted at this temperature by adding separately and simultaneously during the course of one hour, 124 parts of phenylacetyl chloride (80% of theory) and 300 parts of 5 N NaOH.

The reaction mixture, which now contained the sodium salt of G-penaldic acid diethyl acetal, was extracted once with 500 parts of ether, cooled to 5° C. and acidified with 5 N HCl until strongly acid to congo indicator (about 470 parts of 5 N HCl were required). The solution was then exhaustively extracted with 1000 parts of ether, by means of a liquid-liquid extraction apparatus. The ether extract was washed by shaking four times with 50 parts of water, dried with anhydrous sodium sulfate and filtered. The filtrate was concentrated to a thin syrup, which was extracted five times with petroleum ether (Skelly-F) by heating with stirring, and decanting. On cooling, crystallization of the diethyl acetal of G-penaldic acid occurred spontaneously and was allowed to proceed overnight at 4° C.

After removing the first crop of crystals, three more successive crops were obtained from the filtrates by repeating the extraction with petroleum ether. The combined crops of crystals were further purified by dissolving in alkali, washing with ether, acidifying, extracting with ether, concentrating and recrystallizing. In this manner 58 parts of the pure diethyl acetal of G-penaldic acid, M. P. 111-112° C., was obtained, which amounted to a yield of 20% of that required by theory. The product exhibited the following analysis:

| | C | H | N | Ethoxyl | Neutral Equivalent |
|---|---|---|---|---|---|
| Theory for $C_{13}H_{21}O_5N$ | 61.02 | 7.12 | 4.75 | 30.5 | 295 |
| Found | 61.24 | 7.06 | 4.71 | 30.4 | 295 |

Starting with glycine, the overall yield of the diethyl acetal of G-penaldic acid was 18 percent of that required by theory, obtained cumulatively as follows:

Per cent
(1) Glycine to glycine ethyl ester hydrochloride _____ 95
(2) Glycine ethyl ester hydrochloride to N-formyl glycine ethyl ester _____ 97
(3) N-formyl glycine ethyl ester to the crude sodium enolate of ethyl alpha-formylamino beta-hydroxyacrylate _____ 96
(4) Crude sodium enolate of ethyl alpha-formylamino beta-hydroxyacrylate to the diethyl acetal of G-penaldic acid__ 20

Overall yield _____ 18

By the above procedure, 71 parts of the pure diethyl acetal of G-penaldic acid was obtained from every 100 parts of glycine.

Example 2

A mixture of 139 parts of glycine ethyl ester hydrochloride (1 mol) and 90 parts of formamide (2 mols) was heated at 145° C. for 30 minutes. The reaction mixture was cooled and 200 parts of acetone was added. The precipitated ammonium chloride was removed by filtration, the filtrate was distilled in vacuo, and 98 parts (75% yield) of the product, N-formyl glycine ethyl ester, was obtained in the fraction, B. R. 134° C./4 mm., $n_D^{25}=1.4500$. The product was then further reacted to form derivatives of penaldic acid as described in Example 1 above and subsequent Examples 5, 6, and 7.

Example 3

To 103 parts of glycine ethyl ester (1 mol) was slowly added, with stirring, 1000 parts of 90 percent formic acid (20 mols). The mixture was heated to 60° C. and 306 parts of acetic anhydride (3 mols) was then added at such a rate that the temperature was maintained at 60° C. The solution was then distilled in vacuo and 121 parts (92% yield) of the product, N-formyl glycine ethyl ester, was obtained in the fraction, B. R. 119-120° C./1 mm., $N_D^{25}=1.4501$. The product was then further reacted to form derivatives of penaldic acid as described in Example 1 above and in subsequent Examples 5, 6, and 7.

Example 4

To 103 parts of glycine ethyl ester (1 mol) was slowly added, with stirring, 1000 parts of 97% formic acid (21 mols). The mixture was heated at 60° C. for one hour, then distilled in vacuo, and 68 parts (52% yield) of the product, N-formyl glycine ethyl ester, was obtained in the fraction B. R. 119°-120° C./1 mm., $N_D^{25}=1.4500$. The product was then further reacted to form derivatives of penaldic acid as described in Example 1 above and in subsequent Examples 5, 6, and 7.

Example 5

181 parts (1 mol) of the sodium enolate of ethyl alpha-formylamino beta-hydroxyacrylate, prepared from N-formyl glycine ethyl ester as described in Example 1, was dissolved in 1810 parts of water at 5° C. The solution was stirred and maintained at 5° C. while 112 parts (0.8 mol) of benzoyl chloride was uniformly added during the course of 30 minutes. The crystalline benzoate, which separated during the addition, was removed and washed thoroughly with water, 195 parts (74% yield) being obtained. The product, which is the stable enolic benzoate of ethyl N-formyl penaldate, was readily purified by recrystallization from 95% ethanol. It showed an M. P. of 131-132° C., and exhibited the following analysis:

| | C | H | N | Ethoxyl |
|---|---|---|---|---|
| Theory for $C_{13}H_{13}O_5N$ | 59.31 | 4.98 | 5.32 | 17.11 |
| Found | 59.30 | 4.94 | 5.27 | 17.25 |

On electrometric titration with alcoholic alkali, it showed one titratable group, which is characteristic of the acyl-enolates of the alkyl N-formyl penaldates.

Example 6

181 parts (1 mol) of the sodium enolate of ethyl alpha-formylamino beta-hydroxyacrylate, prepared from N-formyl glycine ethyl ester as described in Example 1, was suspended in acetone and, with stirring, 80 parts of concentrated hydrochloric acid was added. The mixture was vigorously agitated for three hours and then allowed to stand at room temperature overnight. The salt, which had separated, was removed by filtration and the filtrate was concentrated in vacuo to a thick syrup. The latter was dissolved in 230 parts (2.3 mols) of acetic anhydride, which caused a mild exothermic reaction. The mixture was concentrated in vacuo to a thick syrup which crystallized readily after thinning with 95% ethanol and cooling. The crystalline acetate was readily purified by recrystallization from 95% ethanol, 26 parts (13% yield) being obtained in the first crop. The mother liquors readily yielded more of the crystalline product, which is the stable enolic acetate of ethyl N-formyl penaldate, M. P. 194.5°–195.5° C. It exhibited the following analysis:

|  | C | H | N | Ethoxyl | Neutral equivalent |
|---|---|---|---|---|---|
| Theory for $C_8H_{11}O_5N$ | 47.7 | 5.50 | 6.96 | 22.4 | 201 |
| Found | 47.3 | 5.32 | 6.96 | 22.0 | 202 |

*Example 7*

181 parts (1 mol) of the sodium enolate of ethyl alpha-formylamino beta-hydroxyacrylate was converted as described in Example 1 to the sodium salt of alpha-amino beta, beta-diethoxy propionic acid and dissolved in alcoholic solution. The solution was acidified with 200 parts of 5N HCl, agitated for 10 minutes, and then made definitely alkaline to phenolphthalein by adding ammonium hydroxide. It was then concentrated in vacuo to dryness at 45° C. The residue was exhaustively extracted with 2000 parts of hot absolute ethanol. The extract was concentrated to dryness in vacuo and the residue was exhaustively extracted with 80% ethanol. The extract was again concentrated to dryness in vacuo and the residue then recrystallized from 80% ethanol, the product being obtained as long, fluffy, snow-white needles which, on analysis, proved to be the monohydrate of alpha-amino beta, beta-diethoxy propionic acid. A total of 39 parts of the product was obtained, which amounted to a yield of 25% of that required by theory. The product exhibited the following analysis:

|  | N | Ethoxyl | Neutral equiv. | $H_2O$ |
|---|---|---|---|---|
| Theory for $C_7H_{15}O_4N \cdot H_2O$ | 7.17 | 46.2 | 195.2 | 9.22 |
| Found | 7.13 | 46.5 | 195.5 | 9.25 |

On drying in vacuo at 78° C., the hydrate rapidly lost exactly one molecule of water to give the anhydrous product, M. P. 198–200° C.; neutral equivalent, 177.5; theory, 177.2.

On dissolving in water and reacting with phenylacetyl chloride and alkali as described in Example 1, the product was converted practically quantitatively to the diethyl acetal of N-phenylacetyl penaldate (G-penaldic acid).

Having thus described our invention, we claim:

1. An enolic ester of an alkyl ester of formyl penaldic acid of the formula:

$$\begin{array}{c} \text{COOR'} \quad \text{O} \\ | \qquad\qquad \| \\ \text{C}=\text{CH}(\text{OCR}) \\ | \\ \text{H}-\text{N}-\text{CH} \\ \| \\ \text{O} \end{array}$$

in which R' is an alkyl group and $$\begin{array}{c} \text{O} \\ \| \\ \text{RC} \end{array}$$

is an organic acyl radical in which R is a hydrocarbon radical of the group consisting of alkyl and aryl.

2. A compound described as in claim 1 in which $$\begin{array}{c} \text{O} \\ \| \\ \text{RC} \end{array}$$

is acetyl.

3. A compound described as in claim 1 in which $$\begin{array}{c} \text{O} \\ \| \\ \text{RC} \end{array}$$

is benzoyl.

4. The process of preparing an enolic ester of formyl penaldic acid ester, comprising reacting an alkali metal enolate of alkyl alpha-formylamino beta-hydroxyacrylate with an organic carboxylic halide of the formula RCOX in which X is a halogen and R is a hydrocarbon radical of the group consisting of alkyl and aryl.

SAMUEL A. MORELL.
RICHARD W. VON KORFF.

REFERENCES CITED

The following references are of record in the file of this patent:

UNITED STATES PATENTS

| Number | Name | Date |
|---|---|---|
| 2,390,335 | Sobotka et al. | Dec. 4, 1945 |
| 2,394,255 | Northey | Feb. 5, 1946 |
| 2,394,967 | Kushner | Feb. 12, 1946 |
| 2,430,455 | Crooks | Nov. 11, 1947 |
| 2,459,059 | Babson | Jan. 11, 1949 |

OTHER REFERENCES

Pechmann: "Ber. deut. Chem.," vol. 25 (1892), pages 1047–1051.

Erlenmeyer et al.: "Liebig's Annalen," vol. 337 (1904), pages 250 to 253.

Wislicenus: "Ber. deut. Chem.," vol. 43 (1910), pages 3530 to 3531.

Cherbuliez et al.: "Helv. Chim. Acta.," vol. 12 (1929), pages 317, 320 and 322.

Upjohn Report, CMR–U–IV, March 15, 1944, pages 24 to 26.

Squibb Report, CMR–XII–b, April 1, 1944, page 2.

Michigan Report, CMR–B–VII, Aug. 1, 1944, pages 1 to 3.

The Chemistry of Penicillin, Princeton U. Press, 1949, pages 486, 492 and 1066.